June 15, 1954 G. M. LOE 2,681,383

TELEVISION RECEIVER

Filed April 13, 1951

INVENTOR.
GERALD M. LOE
BY Francis W. Crotty
ATTORNEY

Patented June 15, 1954

2,681,383

UNITED STATES PATENT OFFICE 2,681,383

TELEVISION RECEIVER

Gerald M. Loe, Maywood, Ill., assignor to Zenith Radio Corporation, a corporation of Illinois Application April 13, 1951, Serial No. 220,833

5 Claims. (Cl. 178—7.7)

Figures 1, 2:
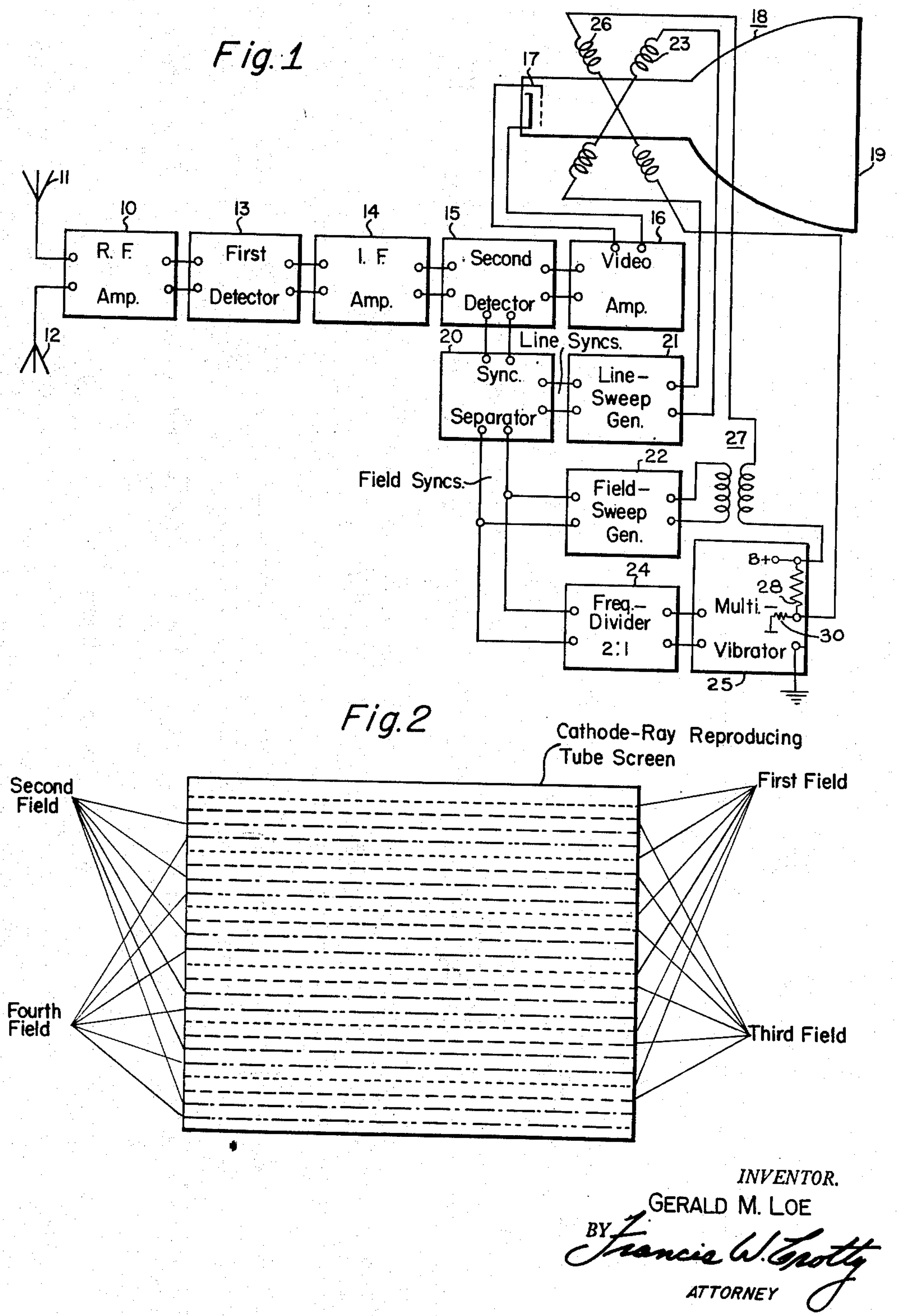

This invention relates to a method of reconstructing images on the screen of a cathode-ray tube as, for example, in the synthesizing of images in a television receiver in response to a received video-modulated signal. Such a signal, in accordance with present-day standards of commercial broadcasting, includes video-frequency components representing the image intelligence as well as line- and field-synchronizing components which designate the time sequence of the scanning functions at the transmitter through which the video signal is derived. The scanning processes at the transmitter and at the receiver proceed in a two-dimensional pattern which is composed of a plurality of interlaced fields of spaced parellel lines, usually double interlace or two-fields per frame being employed.

While such a signal having the conventional composition of 525 lines per frame and 30 frames per second permits satisfactory reproduction of images by receivers having cathode-ray type image reproducing devices of nominal size, the present trend toward the use of larger picture tubes at the receiver introduces an undesirable line grating or visible raster. That is, as the image size is increased, the spacing between contiguous lines of the reproduced image is sufficiently large to produce to the observer the visual sensation of serrations. Manifestly, for most acceptable television viewing and complete enjoyment of the received program, it is necessary to minimize this raster or serrated appearance.

In an effort to overcome this operating limitation using relatively large picture tubes, a technique referred to as "spot wobble" has been proposed. In using that technique, a relatively high-frequency vertical deflection is superposed on the normal scanning deflections so that the electron beam traces a sinuous path in each line trace of the picture screen. The frequency of this "spot wobble" is usually in the vicinity of 10 to 15 megacycles.

Arrangements of that type present certain difficulties which limit their commercial acceptance. In the first place, it is not apparent that the ordinary deflection elements of the picture tube may be employed in effecting the wobble deflection; it is rather expected that the deflection elements would have to be augmented by auxiliary ones. Further, it is awkward and not particularly convenient to generate signals of the required frequency in television receivers intended for home application. Additionally, the wobble frequency, or harmonics thereof, give rise to difficult interference problems in the operation of the receiver.

Accordingly, it is an object of the present invention to provide a method of reproducing images on the screen of a cathode-ray tube which avoids one or more of the afore-recited limitations of prior-art devices.

It is a particular object of the invention to provide an improved method of reconstructing images on the screen of a cathode-ray tube which minimizes the line raster or serrated appearance when the image is traced on a picture tube having a screen of relatively large dimensions.

The method of reproducing images on the screen of a cathode-ray tube by utilizing a composite video signal including video and synchronizing components and representing an image scanned at a predetermined field scanning frequency, in accordance with the subject invention, comprises the step of repeatedly scanning a beam of electrons over the screen under the control of the synchronizing components in a regular two-dimensional pattern comprising a plurality of spaced parallel lines having a predetermined line separation in the field scanning direction. During this scansion of the screen, the beam is modulated in accordance with the video components. Further, in accordance with the invention, the scanning pattern is shifted, at a uniform rate corresponding to a sub-multiple of the field scanning frequency, between a normal position and a second position displaced from the normal position in the field scanning direction by an amount corresponding to a fractional portion of the line separation.

The features of this invention which are believed to be new are set forth with particularity in the appended claims. The invention itself, however, together with further objects and advantages thereof may best be understood by reference to the following description when taken in conjunction with the accompanying drawing, in which:

Figure 1 shows a television receiver constructed to reproduce images in accordance with the method of this invention, and, Figure 2 is a schematic representation of the screen of the image-reproducing device of the receiver on which an image may be reproduced with additional interlacing as provided by the invention.

The receiver of Figure 1 includes a radio-frequency amplifier 10 of one or more stages having input terminals coupled to a suitable antenna circuit 11, 12 and output terminals connected to a first detector 13. First detector 13 is connected to an intermediate-frequency amplifier 14 of any desired number of stages, and the output terminals of this amplifier are connected to a second detector 15. Second detector 15 is connected through a video amplifier 16 of one or more stages to the input electrodes 17 of an image-reproducing device 18. Input electrodes 17 represent the usual electron gun for developing an electron beam in device 18 and for directing the beam to a fluorescent screen 19 affixed to the opposite end of the device.

Second detector 15 is also connected to a synchronizing-signal separator 20 which, in turn, is connected to a line-sweep generator 21 and to a field-sweep generator 22. The output terminals of line-sweep generator 21 are connected to the line-deflection elements 23 associated with device 18. The output terminals of synchronizing-signal separator 20 are also connected to a frequency divider 24 which is connected to a multivibrator 25. The output circuits of sweep generator 22 and multivibrator 25 are connected in series by means of a vertical output transformer 27 and a multivibrator load resistor 28 to the field-deflection elements 26 of device 18. Specifically, the anode of one of the electron-discharge devices (not shown) constituting the conventional multivibrator is connected through load resistors 28 and 30 to a source of unidirectional potential B+. One terminal of resistor 28 is connected to one terminal of the secondary winding of transformer 27 and the other terminal of the resistor is connected to one terminal of vertical deflection coils 26, the other terminal of the deflection coils being connected to the other terminal of the secondary winding of transformer 27. In this way, the secondary winding of transformer 27, load resistor 28 and the field-deflection coils 26 may be connected in series to achieve the results of the present invention.

Neglecting for the moment the function of units 24 and 25, the arrangement of Figure 1 will be recognized as a conventional television receiver of the superheterodyne type which may be tuned to accept and utilize a television signal conforming to present-day standards. Such a signal, as is thoroughly understood in the art, comprises video-frequency components contained in double-interlaced field intervals, line- and field-synchronizing components, as well as the customary equalizing pulses. The received signal, after amplification in radio-frequency amplifier 10, is heterodyned to the selected intermediate frequency of the receiver in first detector 13. The intermediate-frequency signal is amplified in intermediate-frequency amplifier 14, detected in the second or video detector 15, further amplified in video amplifier 16 and applied to the input electrodes of cathode-ray tube 18. The composite signal, including both video and synchronizing signal components, thus applied to the picture tube is effective to control or modulate the intensity of the electron beam in that tube in accordance with video information representing a televised image.

The output signal of detector 15 is likewise applied to synchronizing-signal separator 20 wherein the synchronizing components are separated from the video information. The line-synchronizing components are applied to generator 21 to synchronize its operation and develop in deflection elements 23 a deflection signal to effect scanning of the target area 19 of the picture tube in the horizontal or line-scanning direction. The field-synchronizing components, on the other hand, are delivered to generator 22 and control that generator to develop in deflection elements 26 a field-deflection signal to control the vertical or field scansion of the electron beam. The periodic nature of the scanning signals causes the electron beam to scan screen 19 repeatedly and in well-known fashion in a two-dimensional pattern comprising a pair of interlaced fields of spaced parallel lines. Inasmuch as the beam is video-modulated concurrently with its scansion of the screen area, an image is reproduced in response to the received signal.

In order to minimize the line raster or serrated appearance of the image, in accordance with the present invention, the scanning pattern of the picture tube is displaced in the vertical direction by an amount corresponding to a fractional portion of the line separation of that pattern and at a uniform rate which is less than the field-scanning frequency. More specifically, the scanning raster is displaced vertically from time to time by an amount which preferably corresponds to one-half of the separation of contiguous lines in the image produced in any given frame interval. This is accomplished by frequency divider 24 and multivibrator 25.

The frequency divider may be of any well-known design and construction and may be selected to effect a two-to-one frequency division of field-synchronizing pulses applied to its input circuit from synchronizing-signal separator 20. It controls multivibrator 25 which may be any well-known Eccels-Jordan type of trigger circuit having two stable operating conditions between which it is actuated by successive output pulses of frequency divider 24. That is, one output pulse of the frequency divider establishes one operating condition in the multivibrator; the next output pulse trips the multivibrator into its alternate operating condition; and the third pulse returns the multivibrator to its first-mentioned condition. As a consequence, the output signal of the multivibrator has a substantially square wave form and each half cycle endures for a time interval that is approximately equal to an integral number of field scansions. More particularly, any given half cycle of the output signal of the multivibrator lasts for two field intervals or one frame interval because the division ratio of the frequency divider induces an operating frequency on the multivibrator of one-half the field-scanning frequency.

By connecting the output circuits of field-sweep generator 22 and multivibrator 25 in series with deflection elements 26, the field-deflection signal of the picture tube is superposed on the square-wave signal obtained from the multivibrator. The amplitude of the signal obtained from the multivibrator is chosen so that this signal causes the image raster scanned on screen 19 during one-half cycle to be displaced vertically by a distance corresponding to one-half of the separation of contiguous lines in the frame image relative to the line raster traces in the next succeeding one-half cycle.

Referring now more particularly to Figure 2, in conventional double-interlaced scanning of a picture tube, obtained in the absence of units 24 and 25 or their equivalent, successive odd-numbered fields of a received signal are traced in superposed relation on the lines identified by the legend "First Field." And successive even-numbered fields are traced in superposed relation with respect to the lines represented in the pattern designated "Second Field," the first and second fields being interlaced. Where the scanning raster is displaced from time to time, however, the effect is to introduce additional and displaced patterns designated "Third Field" and "Fourth Field." These fields have the same interlaced relation relative to one another as the scanning pattern constituted by the first-mentioned, interlaced first and second fields. However, the pattern constituted by the third and fourth fields is displaced in a vertical or field-scanning direction relative to the pattern comprised of the first and second fields, preferably by one-half the separation of successive lines of the image.

The present invention provides, therefore, an improved television receiver which utilizes a standard television signal to reproduce an improved image on the screen of the receiver reproducing device. The improvement in the image is effected by reducing the tendency of repeated frame scansions to introduce a line grating or serrated effect and it is accomplished by means of a relatively inexpensive arrangement. The displacement of the scanning raster to avoid a visible line grating is achieved by a deflecting signal that may be applied to the normal deflection elements concurrently with the sweep signals.

While a particular embodiment of the invention has been shown and described, modifications may be made therein and it is intended in the appended claims to cover all such modifications as may fall within the true spirit and scope of the invention.

I claim:

1. The method of reproducing images on the screen of a cathode-ray tube by utilizing a composite video signal including video and synchronizing components and representing an image scanned at a predetermined field-scanning frequency, which method comprises the steps of: repeatedly scanning a beam of electrons over said screen under the control of said synchronizing components in a regular two-dimensional pattern comprising a plurality of spaced parallel lines having a predetermined line separation in the field-scanning direction; modulating said beam in accordance with said video components; and shifting said scanning pattern, at a uniform rate corresponding to a sub-multiple of said field-scanning frequency, between a normal position and a second position displaced from said normal position in said field-scanning direction by an amount corresponding to a fractional portion of said line separation.

2. The method of reproducing images on the screen of a cathode-ray tube by utilizing a composite video signal including video and synchronizing components and representing an image scanned at a predetermined field-scanning frequency, which method comprises the steps of: repeatedly scanning a beam of electrons over said screen under the control of said synchronizing components in a regular two-dimensional pattern comprising a predetermined plurality of interlaced fields of spaced parallel lines having a predetermined line separation in the field-scanning direction; modulating said beam in accordance with said video components; and shifting said scanning pattern, at uniformly spaced time intervals each substantially equal in duration to an integral number of field scansions corresponding to said predetermined plurality of interlaced fields, between a normal position and a second position displaced from said normal position in said field-scanning direction by an amount corresponding to a fractional portion of said line separation.

3. The method of reproducing images on the screen of a television receiver cathode-ray tube by utilizing a composite video signal including video and synchronizing components and representing an image scanned at a predetermined field-scanning frequency, which method comprises the steps of: repeatedly scanning a beam of electrons over said screen under the control of said synchronizing components in a regular two-dimensional pattern comprising a plurality of spaced parallel lines having a predetermined line separation in the field-scanning direction; modulating said beam in accordance with said video components; and shifting said scanning pattern, at a uniform rate corresponding to a sub-multiple of said field-scanning frequency, between a normal position and a second position displaced from said normal position in said field-scanning direction by an amount corresponding to one-half of said line separation.

4. The method of reproducing images on the screen of a television receiver cathode-ray tube by utilizing a composite video signal including video and synchronizing components and representing an image scanned at a predetermined field-scanning frequency, which method comprises the steps of: repeatedly scanning a beam of electrons over said screen under the control of said synchronizing components in a regular two-dimensional pattern comprising a pair of interlaced fields of spaced parallel lines having a predetermined line separation in the field-scanning direction; modulating said beam in accordance with said video components; and shifting said scanning pattern, at a uniform rate corresponding to one-half of said field-scanning frequency, between a normal position and a second position displaced from said normal position in said field-scanning direction by an amount corresponding to a fractional portion of said line separation.

5. The method of reproducing images on the screen of a television receiver cathode-ray tube by utilizing a composite video signal including video and synchronizing components and representing an image scanned at a predetermined field-scanning frequency, which method comprises the steps of: repeatedly scanning a beam of electrons over said screen under the control of said synchronizing components in a regular two-dimensional pattern comprising a pair of interlaced fields of spaced parallel lines having a predetermined line separation in the field-scanning direction; modulating said beam in accordance with said video components; and shifting said scanning pattern, by a uniform rate corresponding to one-half of said field-scanning frequency, between a normal position and a second position displaced from said normal position in said field-scanning direction by an amount corresponding to one-half of said line separation.

References Cited in the file of this patent

UNITED STATES PATENTS

| Number | Name | Date |
|---|---|---|
| 2,143,933 | Barthelemy | Jan. 17, 1939 |
| 2,222,934 | Blumlein | Nov. 26, 1940 |
| 2,421,521 | Poch | June 3, 1947 |
| 2,472,774 | Mayle | June 7, 1949 |
| 2,566,764 | Fyler et al. | Sept. 4, 1951 |